(12) United States Patent
Yeh et al.

(10) Patent No.: US 10,464,833 B2
(45) Date of Patent: Nov. 5, 2019

(54) SYSTEMS AND METHODS FOR TREATING DILUTE WASTEWATER

(71) Applicant: UNIVERSITY OF SOUTH FLORIDA, Tampa, FL (US)

(72) Inventors: Daniel H. Yeh, Tampa, FL (US); George H. Dick, New Port Richey, FL (US); Robert A. Bair, Tampa, FL (US); Onur Y. Ozcan, Tampa, FL (US); Jorge Luis Calabria, Land O'Lakes, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 15/547,820

(22) PCT Filed: Mar. 5, 2016

(86) PCT No.: PCT/US2016/021087
§ 371 (c)(1),
(2) Date: Aug. 1, 2017

(87) PCT Pub. No.: WO2016/141369
PCT Pub. Date: Sep. 9, 2016

(65) Prior Publication Data
US 2018/0016171 A1    Jan. 18, 2018

Related U.S. Application Data

(60) Provisional application No. 62/128,696, filed on Mar. 5, 2015.

(51) Int. Cl.
*C02F 3/28* (2006.01)
*B01D 61/08* (2006.01)
(Continued)

(52) U.S. Cl.
CPC .......... *C02F 3/2853* (2013.01); *B01D 61/08* (2013.01); *B01D 61/142* (2013.01);
(Continued)

(58) Field of Classification Search
CPC ............ C02F 3/2853; C02F 2209/42; C02F 2209/08; C02F 2303/02; C02F 2103/005;
(Continued)

(56) References Cited

U.S. PATENT DOCUMENTS 4,632,758 A    12/1986  Whittle
6,254,779 B1 *  7/2001  Jeffery ............... B01D 61/04
                                                  210/195.2
(Continued)

FOREIGN PATENT DOCUMENTS

WO    2005123603 A1    12/2005
WO    2012082967 A3     6/2012

OTHER PUBLICATIONS

International Search Report for PCT/US2016/021087 dated May 20, 2016.
(Continued)

*Primary Examiner* — Fred Prince
(74) *Attorney, Agent, or Firm* — Thomas | Horstemeyer, LLP (57) ABSTRACT

In one embodiment, a dilute wastewater treatment system includes a separation subsystem configured to receive dilute wastewater and separate it into a product stream containing a low concentration of organic material and a reject stream containing a high concentration of organic material, and a conversion subsystem configured to receive the reject stream from the separation subsystem and anaerobically treat the reject stream to break down the organic material and separate it from water within the reject stream.

21 Claims, 6 Drawing Sheets

(51) Int. Cl.
| | |
|---|---|
| *B01D 61/14* | (2006.01) |
| *C02F 1/32* | (2006.01) |
| *C02F 1/38* | (2006.01) |
| *C02F 3/12* | (2006.01) |
| *C02F 3/32* | (2006.01) |
| *B01D 61/18* | (2006.01) |
| *C02F 1/44* | (2006.01) |
| *C02F 1/467* | (2006.01) |
| *C02F 1/76* | (2006.01) |
| *C02F 103/00* | (2006.01) |
| *C02F 101/10* | (2006.01) |
| *C02F 101/16* | (2006.01) |

(52) U.S. Cl.
CPC ......... *B01D 61/145* (2013.01); *B01D 61/147* (2013.01); *B01D 61/18* (2013.01); *C02F 1/32* (2013.01); *C02F 1/385* (2013.01); *C02F 1/444* (2013.01); *C02F 1/4674* (2013.01); *C02F 1/76* (2013.01); *C02F 3/1226* (2013.01); *C02F 3/322* (2013.01); *B01D 2311/06* (2013.01); *B01D 2311/08* (2013.01); *B01D 2311/2642* (2013.01); *B01D 2311/2676* (2013.01); *B01D 2311/2688* (2013.01); *B01D 2317/02* (2013.01); *C02F 2101/105* (2013.01); *C02F 2101/16* (2013.01); *C02F 2103/002* (2013.01); *C02F 2103/005* (2013.01); *C02F 2209/001* (2013.01); *C02F 2209/08* (2013.01); *C02F 2209/42* (2013.01); *C02F 2303/02* (2013.01); *Y02W 10/15* (2015.05); *Y02W 10/37* (2015.05)

(58) Field of Classification Search
CPC .......... C02F 2209/001; C02F 2103/002; C02F 1/444; C02F 1/385; C02F 1/4674; C02F 1/76; C02F 3/322; C02F 3/1226; C02F 1/32; C02F 2101/16; C02F 2101/105; Y02W 10/15; Y02W 10/37; B01D 2311/08; B01D 2311/2688; B01D 2311/2642; B01D 2311/06; B01D 61/145; B01D 61/18; B01D 61/147; B01D 61/08; B01D 61/142; B01D 2311/2676; B01D 2317/02
USPC ........ 210/603, 609, 612, 613, 175, 252, 259
See application file for complete search history.

(56) References Cited

U.S. PATENT DOCUMENTS

| | | | |
|---|---|---|---|
| 6,346,197 B1 | 2/2002 | Stephenson et al. | |
| 8,721,889 B2 | 5/2014 | Conner et al. | |
| 8,801,931 B2 | 8/2014 | Liu et al. | |
| 2005/0056588 A1 | 3/2005 | Petering | |
| 2010/0264079 A1* | 10/2010 | Begin ................. | C05F 17/0027 210/603 |
| 2011/0253624 A1* | 10/2011 | Ewing ................... | B01D 61/22 210/607 |
| 2012/0031836 A1* | 2/2012 | Alvarez-Cuenca ..... | C02F 3/301 210/605 |
| 2012/0048801 A1 | 3/2012 | Hong et al. | |
| 2012/0160768 A1 | 6/2012 | Tanaka et al. | |
| 2013/0213883 A1 | 8/2013 | Josse et al. | |
| 2014/0034574 A1 | 2/2014 | Josse et al. | |

OTHER PUBLICATIONS

Henze, et al., "Wastewater Characterization" Chapter 3, 2008 Mogens Henze, Biological Wastewater Treatment: Principles Modelling and Design, ISBN: 9781843391883, Published by IWA Publishing, London, UK, pp. 33-52.

Visvanathan, et al., "Critical Reviews in Environmental Science and Technology", Taylor & Francis, Critical Reviews in Environmental Science and Technology, 30(1):1-48, 2001.

Dick, George, "Direct Membrane Filtration of Domestic Wasterwater: Implications for Coupling with Anaerobic Bioreacter (DF-AnMBR) for Wastewater Resource Recovery", USF Scholar Commons, Jan. 2015.

Aitken, M.D., Sobsey, M.D., Blauth, K.E., Shehee, M., Crunk, P.L., Walters, G.W. 2005. Inactivation of Ascaris suum and poliovirus in biosolids under thermophilic anaerobic digestion conditions. Environmental science & technology, 39(15), 5804-5809.

Bazilian, M., Rogner, H., Howells, M., Hermann, S., Arent, D., Gielen, D., Steduto, P., Mueller, A., Komor, P., Tol, R.S. 2011. Considering the energy, water and food nexus: towards an integrated modelling approach. Energy Policy, 39(12), 7896-7906.

Burt, C., O'Connor, K., Ruehr, T. 1998. Fertigation. Irrigation Training and Research Center, California Polytechnic State University.

Butler, R., MacCormick, T. 1996. Opportunities for decentralized treatment, sewer mining and effluent re-use. Desalination, 106(1), 273-283.

Calabria, J. 2014. Wastewater Nutrient Recovery Using Anaerobic Membrane Bioreactor (AnMBR) Permeate for Hydroponic Fertigation. MS thesis. Civil and Environmental Engineering, University of South Florida. Tampa, Fl.

Choo, K.-H., Lee, C.-H. 1996. Membrane fouling mechanisms in the membrane-coupled anaerobic bioreactor. Water Research, 30(8), 1771-1780.

Cornell, S., Kalt, J.P. 1990. Pathways from poverty: Economic development and institution-building on American Indian reservations. American Indian Culture and Research Journal, 14(1), 89-125.

Fabiani, C. 1999. Membrane processes for industrial wastewater reuse. Water Management, Purificaton, and Conservation in Arid Climates: Water Purification, 2, 101.

Gander, M., Jefferson, B., Judd, S. 2000. Membrane bioreactors for use in small wastewater treatment plants: membrane materials and effluent quality. Water Science and Technology, 41(1), 205-211.

Gao, D.-W., Zhang, T., Tang, C.-Y.Y., Wu, W.-M., Wong, C.-Y., Lee, Y.H., Yeh, D.H., Criddle, C.S. 2010. Membrane fouling in an anaerobic membrane bioreactor: Differences in relative abundance of bacterial species in the membrane foulant layer and in suspension. Journal of Membrane Science, 364(1), 331-338.

Guest, J.S., Skerlos, S.J., Barnard, J.L., Beck, M.B., Daigger, G.T., Hilger, H., Jackson, S.J., Karvazy, K, Kelly, L., Macpherson, L. 2009. A New Planning and Design Paradigm to Achieve Sustainable Resource Recovery from Wastewater 1. Environmental science & technology, 43(16), 6126-6130.

Hagin, J., Lowengart, A. 1995. Fertigation for minimizing environmental pollution by fertilizers. Fertilizer research, 43(1-3), 5-7.

Hansen, K.H., Angelidaki, I., Ahring, B.K. 1998. Anaerobic digestion of swine manure: inhibition by ammonia. Water research, 32(1), 5-12.

Hatamoto, M., Miyauchi, T., Kindaichi, T., Ozaki, N., Ohashi, A. 2011. Dissolved methane oxidation and competition for oxygen in down-flow hanging sponge reactor for post-treatment of anaerobic wastewater treatment. Bioresource technology, 102(22), 10299-10304.

Hellegers, P., Zilberman, D., Steduto, P., McCornick, P. 2008. Interactions between water, energy, food and environment: evolving perspectives and policy issues. Water Policy, 10.

Howell, C., Conradie, W. 2013. Comparison of Three Different Fertigation Strategies for Drip Irrigated Table Grapes—Part II. Soil and Grapevine Nutrient Status. South African Journal of Enology & Viticulture, 34(1).

Jiménez, B., Drechsel, P., Koné, D., Bahri, A., Raschid-Sally, L., Qadir, M. 2010. Wastewater, sludge and excreta use in developing countries: an overview. astewater Irrigation.

Kayhanian, M. 1994. Performance of a high-solids anaerobic digestion process under various ammonia concentrations. Journal of Chemical Technology and Biotechnology, 59(4), 349-352.

Khan, S., Hanjra, M.A. 2009. Footprints of water and energy inputs in food production—Global perspectives. Food Policy, 34(2), 130-140.

(56) References Cited

OTHER PUBLICATIONS

Liao, B.-Q., Kraemer, J.T., Bagley, D.M. 2006. Anaerobic membrane bioreactors: applications and research directions. Critical Reviews in Environmental Science and Technology, 36(6), 489-530.

Liu, Z.-h., Yin, H., Dang, Z., Liu, Y. 2013. Dissolved Methane: A Hurdle for Anaerobic Treatment of Municipal Wastewater. Environmental science & technology.

Marks, J., Martin, B., Zadoroznyj, M. 2006. Acceptance of water recycling in Australia: national baseline data. Water, 33(2), 151-157.

McCarty, P.L., Bae, J., Kim, J. 2011. Domestic wastewater treatment as a net energy producer—Can this be achieved? Environmental science & technology, 45(17), 7100-7106.

Nouri, J., Jafarinia, M., Naddafi, K., Nabizadeh, R., Mahvi, A., Nouri, N. 2006. Energy recovery from wastewater treatment plant. Pakistan Journal of Biological Sciences, 9(1), 3-6.

Pauss, A., Andre, G., Perrier, M., Guiot, S.R. 1990. Liquid-to-gas mass transfer in anaerobic processes: inevitable transfer limitations of methane and hydrogen in the biomethanation process. Applied and Environmental Microbiology, 56(6), 1636-1644.

Prieto, A.L., Futselaar, H., Lens, P.N., Bair, R., Yeh, D.H. 2013. Development and start up of a gas-lift anaerobic membrane bioreactor (gl-anmbr) for conversion of sewage to energy, water and nutrients. Journal of Membrane Science.

Smith, A.L., Skerlos, S.J., Raskin, L. 2013. Psychrophilic anaerobic membrane bioreactor treatment of domestic wastewater. Water research, 47(4), 1655-1665.

United Nations. 2013a. The Millennium Development Goals Report 2013. United Nations.

United Nations, D.o.E.a.S.A. 2013b. World population prospects: The 2012 Revision, Key Findings and Advance Tables. United Nations.

USEPA. 2007. Innovation and Research for Water Infrastructure for the 21st Century. 600/X-09/003.

USEPA. 2005. Membrane Filtration Guidance Manual. EPA 815-R-06-009.

USGBC. 2013. LEED v4: User Guide. United States Green Building Council.

Water, S. 2006. Sewer Mining: How to establish a sewer mining operation. Sydney Water.

Wisser, D., Frolking, S., Douglas, E.M., Fekete, B.M., Vörösmarty, C.J., Schumann, A.H. 2008. Global irrigation water demand: Variability and uncertainties arising from agricultural and climate data sets. Geophysical Research Letters, 35, 24408.

Trompette Jr, P.-A. 2013. Urban agriculture: a social development tool: improving access to affordable, healthy food in a low-income area of Toronto, Canada.

\* cited by examiner

SYSTEMS AND METHODS FOR TREATING DILUTE WASTEWATER

CROSS-REFERENCE TO RELATED APPLICATION

This application is the 35 U.S.C. § 371 national stage application of PCT Application No. PCT/US2016/021087, filed Mar. 5, 2016, where the PCT claims priority to U.S. Provisional Application Ser. No. 62/128,696, filed Mar. 5, 2015, both of which are herein incorporated by reference in their entireties.

NOTICE OF GOVERNMENT-SPONSORED RESEARCH

This invention was made with Government support under grant contract number RD835569 awarded by the U.S. Environmental Protection Agency. The Government has certain rights in the invention.

BACKGROUND

Aerobic biological systems are the most commonly used processes for treating wastewaters laden with biodegradable contaminants. Despite the prevalence of these systems, they utilize considerable amounts of energy for aeration, which translates to a high cost for adequate contaminant removal. This expense has spurred interest in using anaerobic biological systems for wastewater treatment. Anaerobic systems significantly reduce the energy demand required for treatment and also produce an energy source in the form of biogas. The biogas produced can be used to offset the energy demand for water conveyance and other system processes. Despite the benefits of utilizing anaerobic systems, technological hurdles still exist that have prevented their widespread application. Several of these hurdles are described below.

Domestic wastewater is typically of very low strength because it typically comprises black water (fecal matter and flush water) and yellow water (urine and flush water) that are mixed with large amounts of greywater (shower, sink, and laundry water). The strength of wastewater is typically represented by the amount of organic matter present, measured by the concentration of chemical oxygen demand (COD). Anaerobic processes are more efficient at treating higher strength wastewater due to increased microbial activity and increased contact between the microbial mass and the contaminants. Although dilute wastewaters can be treated anaerobically, to do so typically requires large reactors to manage the high volumes of water entering the system. Large reactors require higher capital investments for construction and maintenance, which can negate some of the benefits of choosing anaerobic over aerobic biological systems. Beyond domestic wastewaters, there are many industrial wastewaters that also fall into the category of dilute wastewaters.

Source separation has been suggested as a possible remedy for preventing the dilution of higher strength wastewaters. While source separation can, in theory, be utilized to prevent dilution, it is often costly to implement as it requires retrofitting existing infrastructure and the use of redundant conveyance systems. Source separation also requires user behavior change and buy-in to be effective. These two issues have prevented source separation from being widely used. Until a technological solution is available, dilute wastewaters will likely continue to be treated using aerobic biological systems despite their high cost.

Depending on their source, wastewaters can contain high levels of nitrogenous compounds. When nitrogen-rich wastewaters are introduced to anaerobic processes, the nitrogen is generally not removed and passes through the system as ammonium. High ammonia levels can inhibit methanogenesis, a key process in the creation of biogas, thus decreasing the amount of energy that can be recovered from wastewater treatment. High levels of ammonia can also cause scaling and struvite precipitation, which often result in severe problems with the pumps and tubing of anaerobic systems. This problem can be worse at building-scale treatment plants where less dilution is available. For these reasons, anaerobic systems are often not selected when treating nitrogen-rich wastewaters.

Energy is often required to heat either the feed or bioreactors used in anaerobic wastewater treatment. Such heating increases the inactivation rate of pathogens, especially helminths such as *Ascaris*, which are prevalent in developing countries. To be effective, the disinfection temperature and contact time should be at least 60° C. for 30 minutes. Heating is also effective at accelerating the disintegration and hydrolysis of particles, which abound in wastewater. Further, anaerobic processes excel at thermophilic (55° C.) conditions for hydrolysis and acid production, and mesophilic (35° C.) conditions for methanogenesis. Unfortunately, heating large volumes of wastewater and/or large reactors comes at a tremendous energy cost. For industrial wastewater or sludge (more concentrated organics and lower volume), there is often enough chemical energy contained with the wastewater to offset heating requirements. However, the situation is much more challenging for dilute wastewater. For example, the energy contained within municipal wastewater may be insufficient to provide enough biogas to offset the system's heating requirements. The problem is exacerbated in cold climates where the heating demand is highest. Although solar thermal energy can be integrated into the process to provide heating, it is not always an option in low-solar areas or during cloudy periods. Solar energy storage is a possibility but presents its own challenges.

With the rise in popularity of anaerobic wastewater treatment, concerns have been raised about fugitive methane emissions associated with uncaptured dissolved methane in the effluent. The problem is worse under psychrophilic conditions, due to higher solubility of methane, and for municipal wastewater, due to greater effluent volume for holding the dissolved methane. Although this problem can be alleviated through temperature increase and volume reduction, this would come at the price of higher energy costs.

From the above discussion, it can be appreciated that the majority of problems related to using anaerobic systems for wastewater treatment relate to the dilute nature of the wastewater. While many inventions have focused on improving the ability of these systems to handle low-strength wastewaters, they have not been able to solve the problem.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

It would be desirable to have technologies to concentrate dilute wastewater to facilitate anaerobic processing of the wastewater. Disclosed herein are embodiments of such technologies and wastewater treatment systems that incorporate them. In some embodiments, a wastewater treatment system performs an initial separation process on the wastewater to separate it into an aqueous product stream comprising mostly liquid and a reject stream containing particulate and colloidal matter. In some embodiments, the separation process is performed using microfiltration or ultrafiltration. The system further performs a conversion process on the reject stream to remove the constituents of the stream or convert them into beneficial products. In some embodiments, the conversion process is performed using an anaerobic process, for example, using an anaerobic membrane bioreactor.

This disclosure describes systems and methods useful for wastewater treatment and resource recovery. By incorporating unique combinations of separation, conversion, and polishing technologies in stages, the overall process is improved in terms of footprint, volume, throughput, energy consumption, cost, etc. over conventional methods of wastewater treatment and resource recovery.

Figure 1:
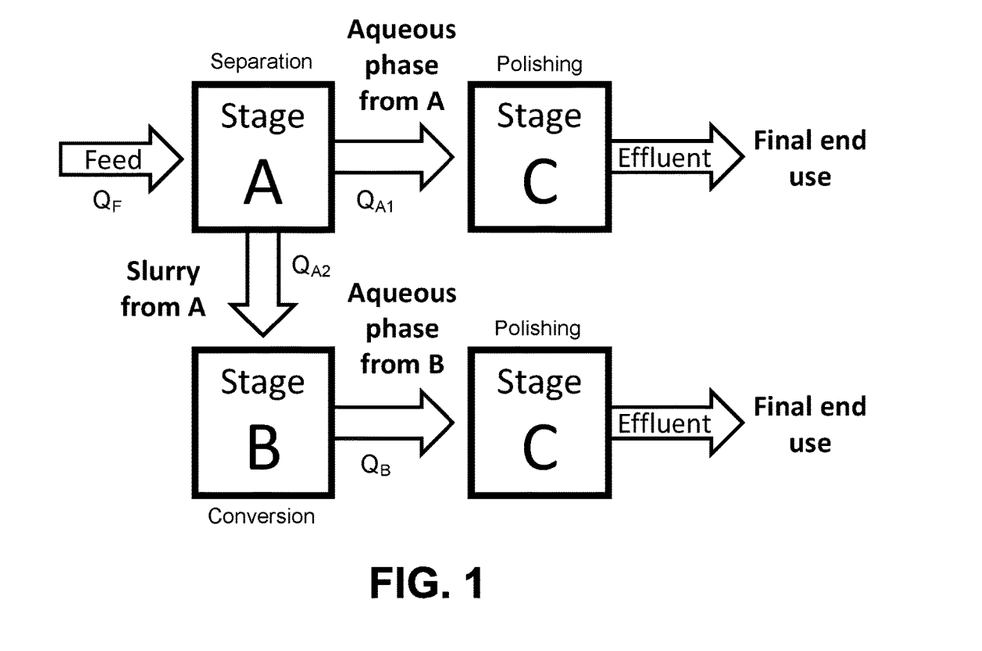
FIG. 1 is a schematic diagram of an embodiment of a wastewater treatment process.

FIG. 1 illustrates an example wastewater treatment process suitable for dilute or low-strength wastewater, such as domestic or municipal wastewater. As shown in this figure, the wastewater treatment process is divided into three sequential stages, including Stage A, a separation stage, Stage B, a conversion stage, and Stage C, an optional polishing stage. Stage A is used to separate the incoming wastewater (also referred to as feed or feed water) $Q_F$ into two streams: a product stream $Q_{A1}$ containing mostly liquid and a low concentration of organic material and a reject stream $Q_{A2}$ containing a high concentration of organic material in the form of particulate and colloidal matter. Depending on the nature of the separation technology that is used in Stage A, the product stream $Q_{A1}$ can either be reused without further treatment or processed further with a polishing process in Stage C before a final end use, or ultimate discharge to the environment.

The reject stream $Q_{A2}$, which contains the majority of particulate and colloidal material from the feed $Q_F$, is fed as influent to Stage B, where wastewater constituents are either removed or converted into beneficial products using an anaerobic process. Once treated, the liquid effluent $Q_B$ (an aqueous stream) of Stage B can be discharged to the environment or used for a variety of final end uses, with or without Stage C polishing. The final solid residue from Stage B can either be beneficially used or disposed. Optionally, a Stage C polishing technology can be inserted to modify the properties of the reject stream $Q_{A2}$ (between Stages A and B). In one possible configuration, solids residues derived from a Stage C polishing of the product stream $Q_{A1}$ may be sent to Stage B for further conversion.

The above-described process aims to address the particular issues associated with anaerobic treatment of dilute wastewaters by first separating the feed wastewater $Q_F$ into a dilute stream $Q_{A1}$ containing a large portion (e.g., 95%) of the volume fraction for reuse or discharge, and a higher strength stream $Q_{A2}$ containing a small portion (e.g., 5%) of the volume fraction, which is fed to Stage B for anaerobic processing. The concentration process changes the characteristics of the wastewater, rendering it more favorable and more efficient to treat using a variety of anaerobic technologies in Stage B. Using a concentration process before anaerobic digestion minimizes the potential for ammonia inhibition, significantly decreases the energy required for system heating, and potentially reduces fugitive methane emissions by decreasing the amount of liquid that passes through the anaerobic reactor. In certain respects, this process can be considered to be a form of "retroactive source separation" for a mixed waste stream wastewater, which does not require special plumbing (redundant conveyance systems) or user behavior changes.

In the disclosure that follows, specific embodiments for the wastewater treatment process depicted in FIG. 1 are described. It is to be understood that these embodiments are examples of the disclosed inventions and that alternative embodiments are possible. All such embodiments are intended to fall within the scope of this disclosure. While the concentration process disclosed herein is described as being performed to facilitate anaerobic treatment, it is noted that it can be utilized in a variety of other treatment contexts. For instance, many chemical reactions and industrial processes can benefit from the concentration processes described below.

Various technologies can be used for each stage of the wastewater treatment process shown in FIG. 1. The selection of the separation technology used for Stage A determines the maximum concentration factor that is possible. It also determines the types of contaminants that are permitted to pass through to Stage C. For Stage A, technologies that are better at separating colloidal and particulate matter from the feed stream are preferred as they will route the majority of contaminants towards Stage B. More efficient separation technologies will also minimize the amount treatment that is required by the product stream exiting Stage A. These separation technologies include gravity-based processes, filtration, thermal separation, and electrochemical separation.

In some cases, filtration is a preferred choice for Stage A separation. Such filtration can include membrane filtration within the microfiltration (MF), ultrafiltration (UF), nanofiltration (NF), reverse osmosis (RO), forward osmosis (FO), FO/RO, and other size-exclusion technologies. When using MF or UF, a filtration aid such as powdered activated carbon or other sorbents, or a coagulant, may be added to reduce membrane fouling and improve rejection. Filtration-based systems can also include the use of industrial-scale systems including belt presses and media filtration. Energy considerations and the nature of the feed water should be taken into consideration when making a determination on the pore size and other characteristics of the membrane or filtration system used as the concentrating technology. For example, MF membranes may be appropriate for feed waters primarily containing large particulates with little soluble or colloidal contaminants. UF membranes may be optimal for the treatment of domestic wastewater due to their ability to retain bacterial pathogens and colloidal materials while having a low energy requirement for operation.

Gravity-based systems that can be used for Stage A can include clarifiers and centrifuges. Gravity-based systems may be preferable when colloidal material is not prominent in the feed water. Thermal separation technologies including distillation and pervaporation systems can also be used in Stage A. These systems may be favored when the feed water contains a large amount of soluble contaminants. With these systems, it is theoretically possible to retain all of the particulate, colloidal, and soluble contaminants while routing all of the water towards Stage C. Electrochemical processes can also be utilized to concentrate charged molecules in Stage A. Stage A can also comprise a combination of these various technologies, for example, gravity settling can be used in conjunction with membrane filtration.

The division of the liquid within Stage A determines the concentration factor CF for the reject stream $Q_{A2}$. The concentration factor is determined by dividing the feed water stream by the rejection stream, i.e., $CF=Q_F/Q_{A2}$. For example, a 1000 L/d influent flow ($Q_F$) reduced to 50 L/d for Stage B ($Q_{A2}$) yields a CF of 20. The value for CF depends greatly on the technology selected for Stage A as well as the nature of the feed water. For feed waters that are highly diluted, e.g., those having a chemical oxygen demand (COD) less than 500 mg/l, a higher concentration factor (e.g., CF=20) is recommended. As the concentration factor increases, the amount of energy required for heating the system decreases while the efficiency of the anaerobic process increases. CF also has an effect on the separation technology used for Stage A. Some technologies will be better at concentrating the particulates, soluble contaminants, or colloidal fraction of the wastewater than others. In some embodiments, it is recommended that at least 30% of the incoming feed water entering Stage A be routed towards Stage C. Amounts below 30% may negate the benefits of introducing a concentrating technology. Depending on the selection of the technology used for Stage A, anywhere between 0 to 100% of the soluble fraction of contaminants can be routed towards Stage B. Distillations processes will be closer to 100%, while a belt press, microfiltration, and gravity-based systems will be closer to 0%. For particulate matter, 60 to 100% of the incoming particulates should be routed towards Stage B.

Stage A separation can be operated in continuous, batch, and/or semi-continuous modes. In a batch mode, the separation technology may slowly drain a feed tank until a set point is reached, as determined by the concentration factor or other requirement. At that point, the concentrated stream or slurry can be pumped to Stage B. The feed tank can then be reset by refilling it with raw feed water. This periodic fill, concentrate, drain cycle can be repeated during batch mode. Continuous operation occurs when the first feed tank is never fully drained of its contents. During continuous operation, raw feed water enters the feed tank as treated water leaves the system towards Stage C. For continuous operation, a constant rate of concentrated wastewater can be removed from the feed tank and routed towards Stage B. Continuous operation can also be accomplished when operating sequential membrane modules that progressively concentrate the feed water. Semi-continuous operation, which comprises a combination of the batch and the continuous modes, can also be used.

The type of conversion system used in Stage B can vary depending on the nature of the feed water and the desired quality of water exiting the system. As noted above, however, anaerobic processes are preferred. Examples of anaerobic conversion technologies include anaerobic digesters, high-rate anaerobic systems, and anaerobic membrane bioreactors. High-rate anaerobic systems include upflow anaerobic sludge blankets (UASB), anaerobic expanded-bed reactor (AEBR), anaerobic fluidized bed reactors (AFBR), expanded granular sludge blankets (EGSB), internal circulation reactors (ICR), and anaerobic filters (AF). Anaerobic digesters can be operated as completely stirred tank reactors (CSTR) or plug flow.

Anaerobic membrane bioreactors (AnMBRs) are completely closed, gas-tight systems that utilize anaerobic microorganisms to treat waste and couple membrane technology to separate the liquid fraction from the microorganisms and other particulate or colloidal material in the bioreactor. When using an AnMBR for Stage B, the overall system has an advantage in terms of effluent quality because microbial biomass and un-degraded contaminants are retained within the system by the membrane. This retention is beneficial because the liquid fraction exiting the AnMBR may be suitable for some direct applications.

Although anaerobic processes are preferred, it is noted that other processes can be utilized for Stage B, including aerobic biological treatment processes and physical-chemical processes such as thermal and advanced oxidation.

Stage C is optionally used to polish the liquid effluent of Stage A and/or Stage B, or as an optional intermediate stage for the reject stream between Stages A and B. The extent of polishing that is required is determined by the quality of water exiting the separation and conversion processes as well as the desired effluent quality. In some cases, no subsequent polishing is required. Polishing processes can include one or more of nutrient recovery and removal, color and odor removal, advanced oxidation processes, and disinfection. The use of a separation technology can minimize the amount of energy and chemical additives that are required for full treatment of the feed water.

Along with discharge, the effluent of Stages A, B, or C can be used for a number of beneficial end points. Some of these options include: irrigation, cooling water, industrial use, manufacturing, washing, toilet flushing, potable reuse, hydroponics, horticulture, aquaponics, or algal cultivation. When coupled with plant or algal growth, the nutrients (e.g., nitrogen, phosphorous, and potassium) within the wastewater can be utilized for growth.

As can be imagined, there are numerous possible configurations for the individual stages and, therefore, the wastewater treatment systems that incorporate those stages. Several example configurations are described below in relation to FIGS. 2-6.

Figure 2:
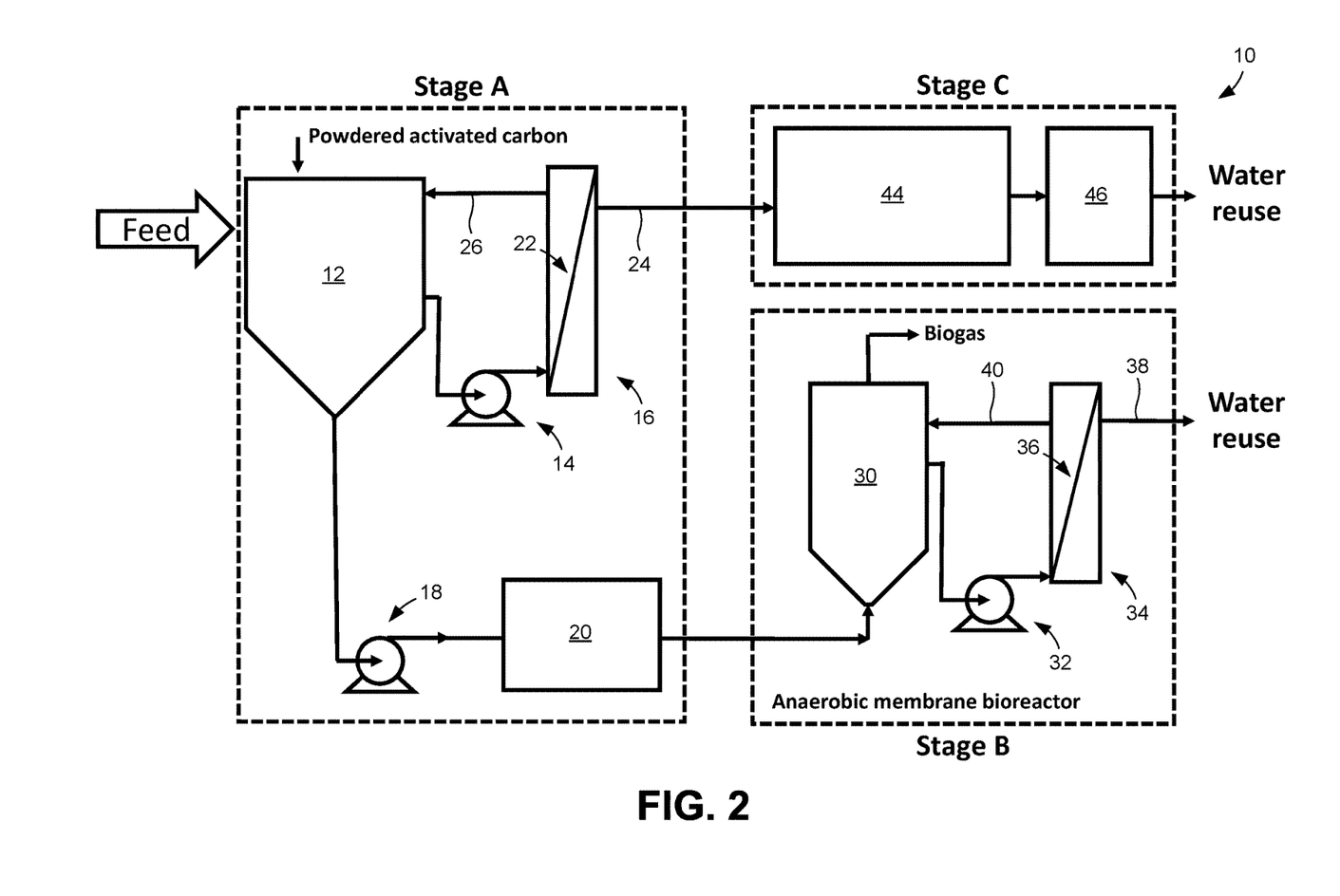
FIG. 2 is a schematic diagram of an embodiment of a wastewater treatment system.

With reference first to FIG. 2, illustrated is an example wastewater treatment system 10. As with the process diagram of FIG. 1, the system 10 includes separate Stages A (separation stage), B (conversion stage), and C (polishing stage). Each stage can be thought of as comprising a separate subsystem of the wastewater treatment system 10. Accordingly, Stage A can be referred to as a separation subsystem, Stage B can be referred to as a conversion subsystem, and Stage C can be referred to as a polishing subsystem.

The Stage A separation subsystem includes components that are used for separating the feed, in the form of dilute wastewater, into a product stream containing mostly liquid that can be directly put to an end use or polished in Stage C and then put to an end use, and a concentrated reject stream containing particulate and colloidal matter that can be delivered to Stage B for conversion. In some embodiments, approximately 90-95% of the wastewater by volume is delivered from Stage A to Stage C and about 5-10% of the wastewater by volume is delivered from Stage A to Stage B.

In the embodiment of FIG. 2, the components of the Stage A separation subsystem include a settling chamber 12, a filtration unit feed pump 14, a filtration unit 16, slurry pump 18, and a heat exchanger 20. During operation of the separation subsystem, the dilute wastewater feed is supplied to the settling chamber 12. As used herein, the term "dilute wastewater" means wastewater having a COD that is less than 1000 mg/l. In some embodiments, a pump or other apparatus (not shown) can be used to drive the wastewater feed into the chamber 12. In addition, the wastewater feed can be passed through a coarse filter, such as a screen, before entering the chamber 12 to remove trash and prevent large, abrasive objects from passing through the subsystem.

As the wastewater collects in the settling chamber 12, much of the particulate and colloidal matter in the wastewater settles to the bottom of the chamber. Wastewater from a point above the bottom of the chamber 12 is fed to the filtration unit 16. In the illustrated embodiment, this wastewater is pumped from the chamber 12 into the filtration unit 16 using the filtration unit feed pump 14.

Provided within the filtration unit 16 are one or more filters 22. Generally speaking, the filters 22 are very fine filters that are capable of rejecting very small particles of material. In some embodiments, the filters 22 can be one or more of MF membranes capable of rejecting molecules, colloids and particles 0.05 µm and larger, UF membranes capable of rejecting molecules, colloids and particles 0.003 µm and larger, and/or NF membranes capable of rejecting molecules, colloids and particles 0.0008 µm and larger. As used herein, MF membranes have an average pore sizes of approximately 0.05 to 2 µm, UF membranes have an average pore sizes of approximately 0.003 to 0.1 µm, and NF membranes have an average pore sizes of approximately 0.0008 to 0.005 µm. In other embodiments, the filters 22 can comprise dynamic filters that filter very small particles as material aggregates on the face of the filter. In such a case, it is possible that the filters 22 can reject particles significantly smaller than the filter's pore size. Irrespective of the specific configuration of the filters 22, the filtration unit 16 divides the wastewater from the settling chamber 12 into two streams: a permeate stream 24 that is delivered to Stage C and a concentrate stream 26 that is returned to the chamber.

As is further shown in FIG. 2, powdered activated carbon optionally can be added to the settling chamber 12 to adsorb or absorb small colloids and prevent them from passing through the filters 22 of the filtration unit 16 and to ensure that they are passed instead to Stage B.

As the filtration process progresses, the wastewater level within the settling chamber 12 drops and the wastewater thickens into a concentrated liquid or slurry. Once the level of wastewater (slurry) drops to a predetermined lower limit (which may be determined using a level sensor, predetermined timing, or through knowledge of the input and output flow rates for the chamber), the filtration unit feed pump 14 ceases to operate and the slurry is emptied from the chamber using the slurry pump 18. The slurry is then delivered to the heat exchanger 20, which heats it to reduce pathogen loading, increase hydrolysis of complex organic matter contained in the slurry, and generally increase the treatment efficiency wastewater treatment system 10. In some embodiments, the heat exchanger 20 heats the slurry to a temperature of approximately 30 to 80° C., preferably 50 to 70° C. It is noted that the heat for the heat exchanger 20 can be derived from various sources comprised by or associated with the system 10. For example, biogas collected from the system 10 in Stage B can be used as a fuel source to provide combustion that heats the heat exchanger 20. Alternatively or in addition, a renewable energy source, such as solar thermal energy or waste heat from nearby industrial processes, can be used to generate this heat. Regardless of the energy source used for the heat exchanger 20, only a relatively small amount of energy is needed as the volume of material to be heated is relatively small because of the separation performed in Stage A.

After the slurry has passed through the heat exchanger 20, it is delivered to the Stage B conversion subsystem. In the embodiment illustrated in FIG. 2, the conversion subsystem is configured as an AnMBR that generally comprises an anaerobic bioreactor 30, a membrane filtration unit pump 32, and a membrane filtration unit 34. The anaerobic bioreactor 12 breaks down the organic material within the slurry using microbes. As the organic material is broken down, biogas is generated that, as mentioned above, can be used as fuel for heating the heat exchanger 20.

As the slurry collects in the anaerobic bioreactor 30, it is pumped to the membrane filtration unit 34 using the membrane filtration unit feed pump 32. Like the filtration unit 16, the filtration unit 34 comprises one or more filters 36 that can have configurations similar to those described above in relation to the filters 22. The filtration unit 34 splits the slurry into two streams: a permeate stream 38 that can be directly put to an end use and a concentrate stream 40 that is returned to the reactor 12 for further anaerobic processing. In some cases, it may be desirable to polish and/or disinfect the permeate output from the AnMBR.

Figure 4:
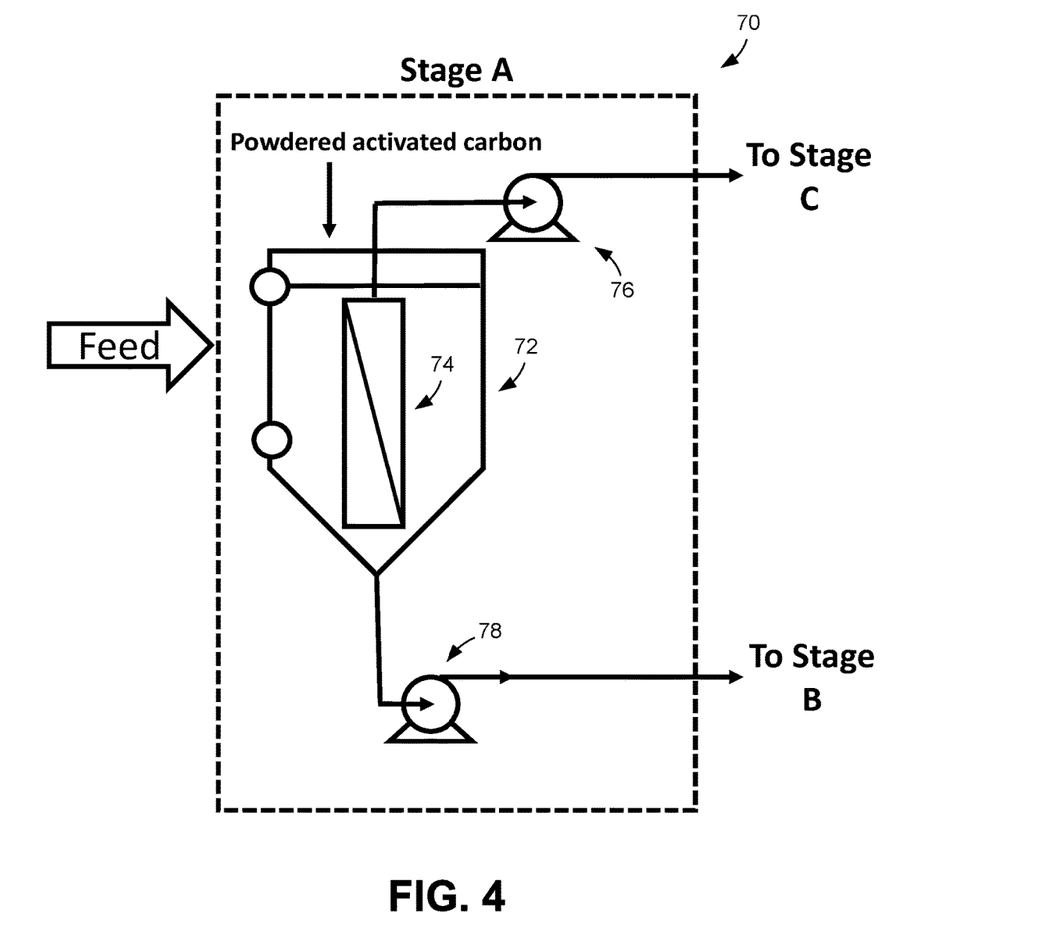
FIG. 4 is a schematic diagram of an embodiment of another alternative separation subsystem (Stage A) that can be used in the system of FIG. 2.

It is noted that, while the filters 36 are separate from the anaerobic bioreactor 30, in other embodiments, the filters can be provided within the bioreactor. An example of a filter within a chamber is shown in FIG. 4.

With further reference to FIG. 2, the permeate from the Stage A separation subsystem optionally can be delivered to the Stage C polishing subsystem. Such a subsystem can take many forms. In the embodiment of FIG. 2, however, the polishing subsystem comprises an algae photobioreactor 44 and a disinfection system 46. The algae photobioreactor 44 removes and recovers nutrients, such as nitrogen and phosphorus, within the permeate, while the disinfection system 46 can use any of a number of disinfection processes, such as electrochlorination, chlorination, ultraviolet exposure, catalysis, and other advanced oxidation processes to kill pathogens within the permeate. It is noted that, in other embodiments, the algae photobioreactor 44 can be omitted and the nutrients can be left in the permeate so that the permeate could be used for irrigation purposes, in which case such nutrients would be useful. In such a case, the irrigation use would remove or capture the nutrients.

Figure 3:
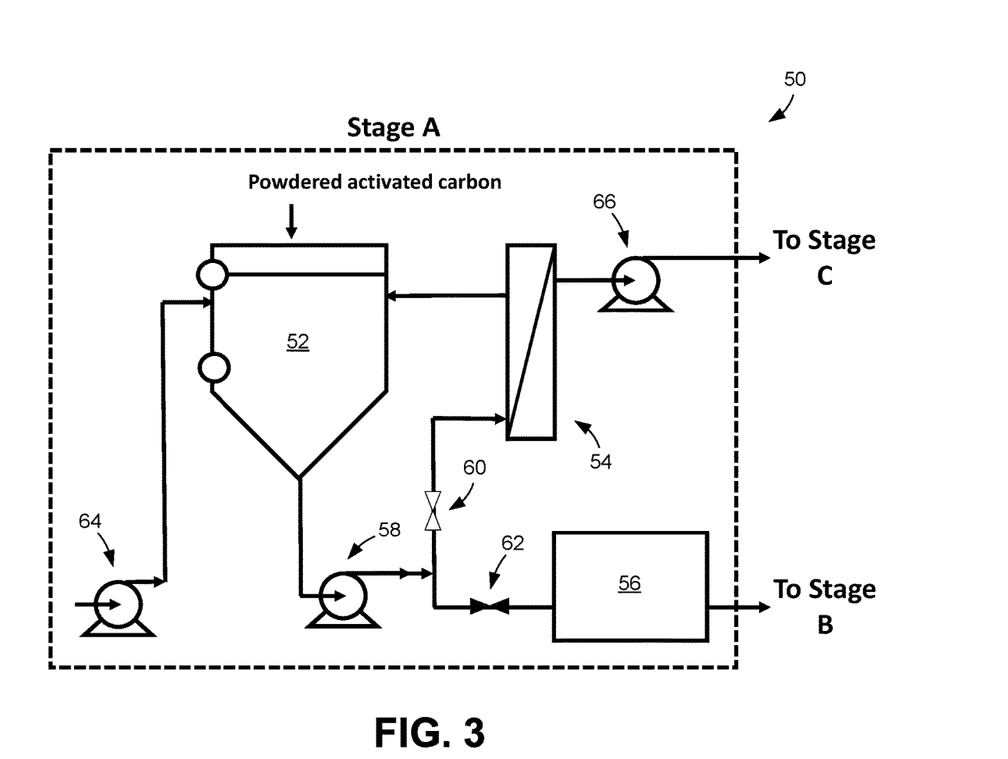
FIG. 3 is a schematic diagram of an embodiment of an alternative separation subsystem (Stage A) that can be used in the system of FIG. 2.

FIG. 3 illustrates an alternative Stage A separation subsystem 50 that could be used in a wastewater treatment system such as the system 10 of FIG. 2. The separation subsystem 50 comprises several of the components of the Stage A separation subsystem shown in FIG. 2. Accordingly, the subsystem 50 comprises a settling chamber 52, a filtration unit 54, and a heat exchanger 56, each of which can have a similar configuration and function to the like-named components described above in relation to FIG. 2. In this embodiment, however, the subsystem 50 is specifically configured for batch operation. Because of this, the subsystem 50 includes settling a chamber pump 58 that can alternately be used to drive wastewater to the filtration unit 54 or drive slurry to the heat exchanger 56 by operating valves 60 and 62. During operation of the subsystem 50, the first valve 60 is open and the second valve is closed so that wastewater is pumped to the filtration unit 54. Once the level within the chamber 52 reaches a predetermined low level (e.g., as determined using a level sensor), the states of the valves 60, 62 are reversed so that the slurry that has formed in the bottom of the chamber can be delivered to the heat exchanger 56.

Also included in the embodiment of FIG. 3 is an influent pump 64 that delivers the wastewater feed to the settling chamber 52 and a permeate pump 66 that pumps permeate from the filtration unit 54 to the Stage C polishing subsystem.

FIG. 4 illustrates another alternative Stage A separation subsystem 70. The separation subsystem 70 is also similar to the Stage A separation subsystem shown in FIG. 2. It therefore includes a settling chamber 72 and a filtration unit 74. In this embodiment, however, the filtration unit 74 is located within the chamber 72 and is submerged in the wastewater that is collected therein. One advantage of this configuration is that no filtration unit feed pump is needed. Also included in the separation subsystem 70 is a permeate pump 76 that pumps permeate from the filtration unit 74 and a slurry pump 78 that pumps slurry from the settling chamber 72.

Figure 5:
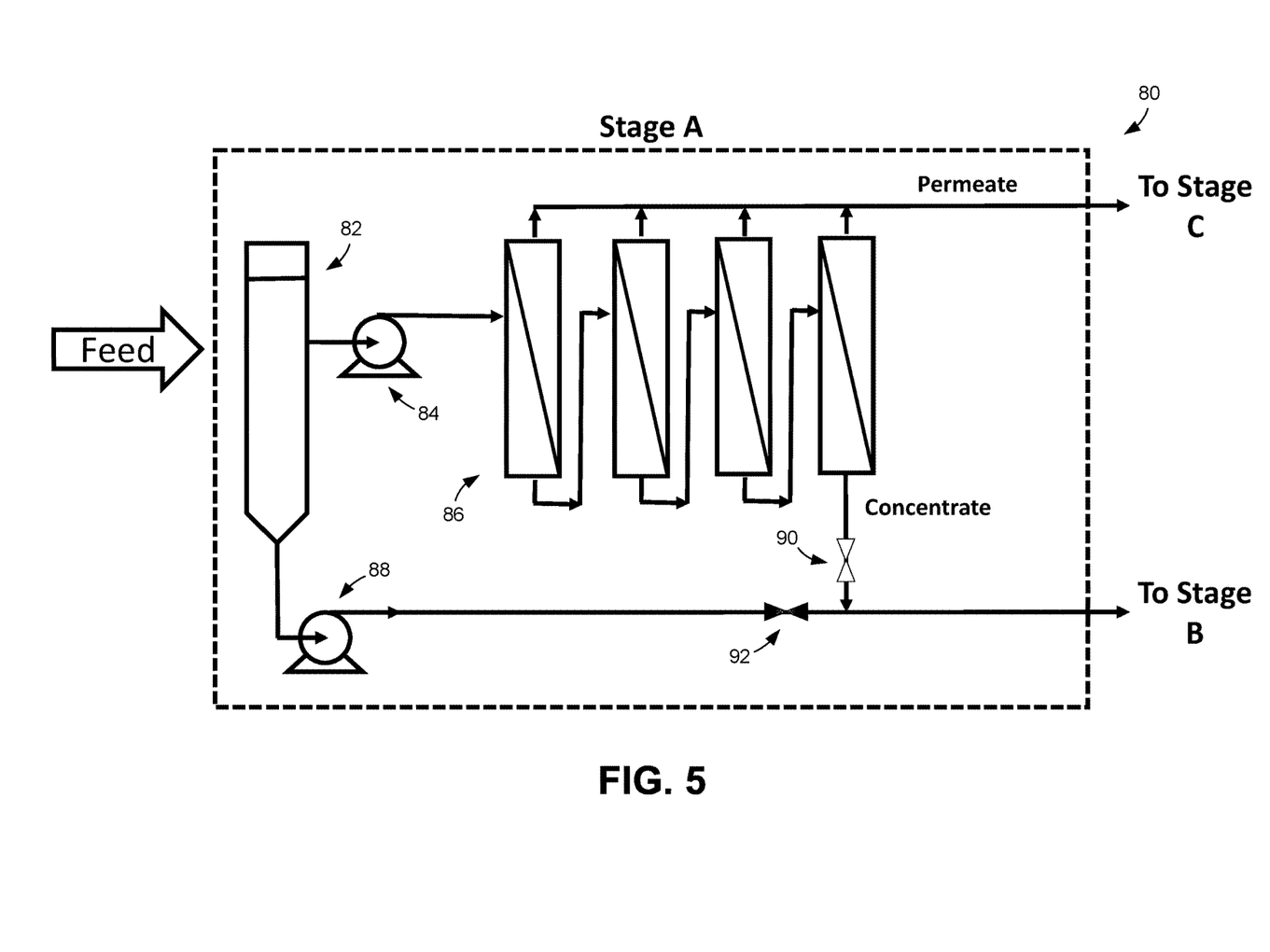
FIG. 5 is a schematic diagram of an embodiment of another alternative separation subsystem (Stage A) that can be used in the system of FIG. 2.

Referring next to FIG. 5, illustrated is a further alternative Stage A separation subsystem 80. The separation subsystem 80 is also similar to the Stage A separation subsystem shown in FIG. 2. The subsystem 80 comprises a settling chamber 82, a filtration feed pump 84, multiple filtration units 86 arranged in a series, and slurry pump 88. By using multiple filtration units 86, concentrate staging can be performed and a slurry of a target thickness can be delivered to the Stage B conversion subsystem. The subsystem 80 further comprises valves 90 and 92 that can be controlled to alternately deliver slurry from the chamber 82 or the filtration units 86 to the conversion subsystem.

Figure 6:
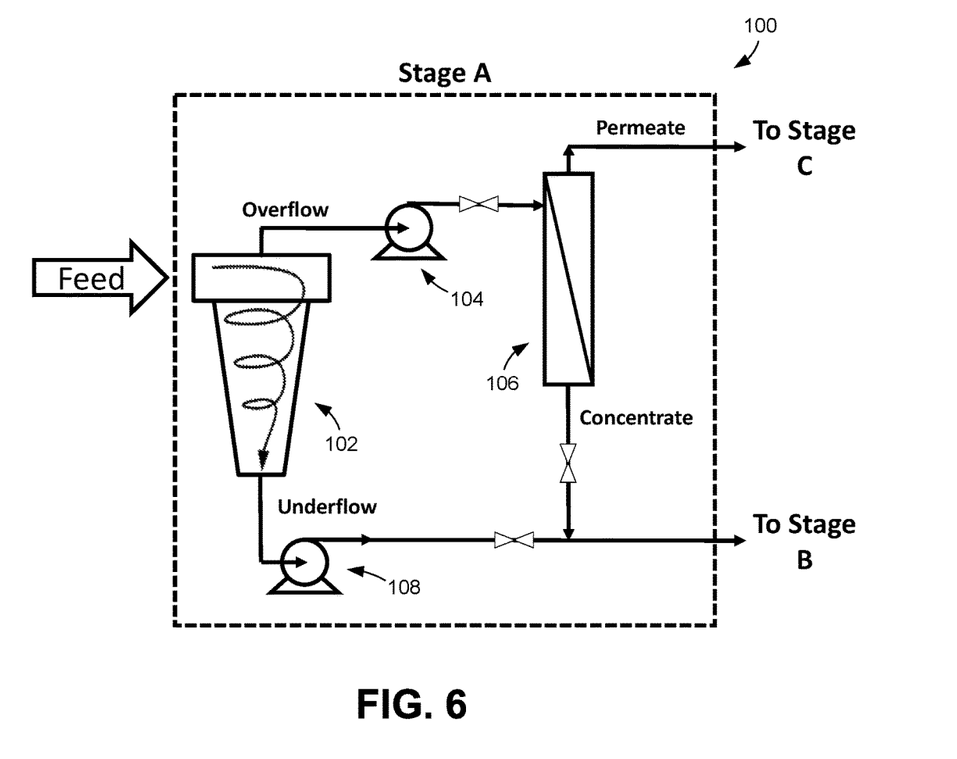
FIG. 6 is a schematic diagram of an embodiment of another alternative separation subsystem (Stage A) that can be used in the system of FIG. 2.

FIG. 6 shows yet another alternative Stage A separation subsystem 100. The subsystem 100 includes a settling chamber 102, a filtration unit feed pump 104, a filtration unit 106, and slurry pump 108. In this embodiment, however, the chamber 102 is configured as a hydrocyclone that directs the incoming wastewater to move in a helical pattern to separate the heavier material (underflow) from the lighter material (overflow) to further aid in the separation process.

Claimed are:

1. A dilute wastewater treatment system comprising:
a separation subsystem configured to receive dilute wastewater and separate the wastewater into a product stream containing a relatively low concentration of organic material and a reject stream containing a relatively high concentration of organic material, the separation subsystem comprising a settling chamber configured to receive the dilute wastewater and collect particulate and colloidal matter in a bottom of the settling chamber and a first filtration unit configured to receive wastewater from a point above the bottom of the settling chamber and filter the wastewater to produce permeate and concentrate, wherein slurry is output from the bottom of the settling chamber as the reject stream; and
a conversion subsystem configured to receive the reject stream from the separation subsystem and anaerobically treat the reject stream, the conversion subsystem being configured as an anaerobic membrane bioreactor that includes an anaerobic bioreactor configured to receive the reject stream and to break down organic material within the reject stream using microbes, the anaerobic membrane bioreactor further including a second filtration unit configured to receive wastewater from the anaerobic bioreactor and filter the wastewater to produce permeate and concentrate.

2. The system of claim 1, wherein the separation subsystem comprises multiple filtration units arranged in series.

3. The system of claim 1, wherein one of the filtration units comprises a microfiltration membrane capable of rejecting molecules, colloids or particles 0.05 μm and larger.

4. The system of claim 1, wherein one of the filtration units comprises an ultrafiltration membrane capable of rejecting molecules, colloids or particles 0.003 μm and larger.

5. The system of claim 1, wherein the first filtration unit is located within the settling chamber.

6. The system of claim 1, wherein the settling chamber is configured as a hydrocyclone.

7. The system of claim 1, wherein the first filtration unit of the separation subsystem is configured to return the concentrate back to the settling chamber.

8. The system of claim 1, wherein the anaerobic bioreactor produces biogas.

9. The system of claim 1, wherein the separation subsystem further comprises a heat exchanger configured to heat the slurry from the settling chamber prior to the slurry being provided to the conversion subsystem.

10. The system of claim 1, further comprising a polishing subsystem configured to treat the permeate from the separation subsystem or the conversion subsystem.

11. The system of claim 10, wherein the polishing system comprises an algae photobioreactor configured to cultivate algae using the permeate as a nutrient source.

12. The system of claim 10, wherein the polishing system comprises a disinfection system configured to disinfect the permeate.

13. A method for treating dilute wastewater having a chemical oxygen demand that is less than 1000 mg/l, the method comprising:
separating the dilute wastewater into a product stream containing a relatively low concentration of organic material and a reject stream containing a relatively high concentration of organic material using a separation subsystem, the separation subsystem comprising a settling chamber that receives the dilute wastewater and collects particulate and colloidal matter in a bottom of the settling chamber and a first filtration unit that receives wastewater from a point above the bottom of the settling chamber and filters the wastewater to produce permeate and concentrate, wherein slurry is output from the bottom of the settling chamber as the reject stream;
delivering the reject stream to a conversion subsystem;
anaerobically treating the reject stream with the conversion subsystem to break down organic material within the reject stream, wherein the conversion subsystem is configured as an anaerobic membrane bioreactor that includes an anaerobic bioreactor that receives the reject stream and breaks down organic material within the reject stream using microbes, the anaerobic membrane bioreactor further including a second filtration unit that receives wastewater from the anaerobic bioreactor and filters the wastewater to produce permeate and concentrate.

14. The method of claim 13, wherein at least one of the filtration units comprises a microfiltration membrane capable of rejecting molecules, colloids or particles 0.05 μm and larger.

15. The method of claim 13, wherein at least one of the filtration units comprises an ultrafiltration membrane capable of rejecting molecules, colloids or particles 0.003 µm and larger.

16. The method of claim 13, wherein the first filtration unit of the separation subsystem returns the concentrate back to the settling chamber.

17. The method of claim 13, further comprising heating the slurry with a heat exchanger before the slurry is provided to the conversion subsystem.

18. The method of claim 17, further comprising producing biogas with the anaerobic bioreactor and using the gas as fuel for the heat exchanger.

19. The method of claim 13, further comprising treating the permeate from the separation subsystem or the conversion subsystem.

20. The method of claim 19, wherein treating the permeate comprises providing the permeate to an algae photobioreactor to cultivate algae using the permeate as a nutrient source.

21. The method of claim 19, wherein treating the permeate comprises providing the permeate to a disinfection system that disinfects the permeate.

\* \* \* \* \*